United States Patent [19]
Phillips

[11] 3,763,410
[45] Oct. 2, 1973

[54] METHOD OF TREATING MATERIAL BY ELECTRICAL DISCHARGE

[75] Inventor: Terrance D. Phillips, Richmond, Va.

[73] Assignee: E.I. du Pont de Nemours and Company, Wilmington, Del.

[22] Filed: Sept. 17, 1971

[21] Appl. No.: 181,553

Related U.S. Application Data

[63] Continuation of Ser. No. 879,419, Nov. 24, 1969, abandoned.

[52] U.S. Cl............................................. 317/262 A
[51] Int. Cl. ......................... B01k 1/00, H01t 19/00
[58] Field of Search...................... 317/3, 4, 262 R, 317/262 A

[56] References Cited
UNITED STATES PATENTS

| | | | |
|---|---|---|---|
| 2,259,647 | 10/1941 | Logan | 323/45 |
| 2,272,756 | 2/1942 | Summers | 323/7 |
| 2,365,611 | 12/1944 | White | 315/279 |
| 2,733,306 | 1/1956 | Bedford | 323/89 |
| 2,767,359 | 10/1956 | Larsen et al. | 317/262 |
| 3,180,974 | 4/1965 | Darling | 219/497 |
| 3,308,045 | 3/1967 | Sullivan | 204/165 |
| 3,351,851 | 11/1967 | Darling | 323/89 |
| 3,391,314 | 7/1968 | Carter | 317/262 |

*Primary Examiner*—L. T. Hix
*Attorney*—Hoge T. Sutherland

[57] ABSTRACT

A method of treating, by electrical discharge, a web of polymeric film wherein the treatment is controlled by monitoring the output current at the electrical discharge treating means and by transmitting this monitored information to a current-controlling means to actuate it whereby to maintain the output current at the electrical discharge treating means within predetermined limits.

5 Claims, 2 Drawing Figures

INVENTOR
TERRANCE D. PHILLIPS

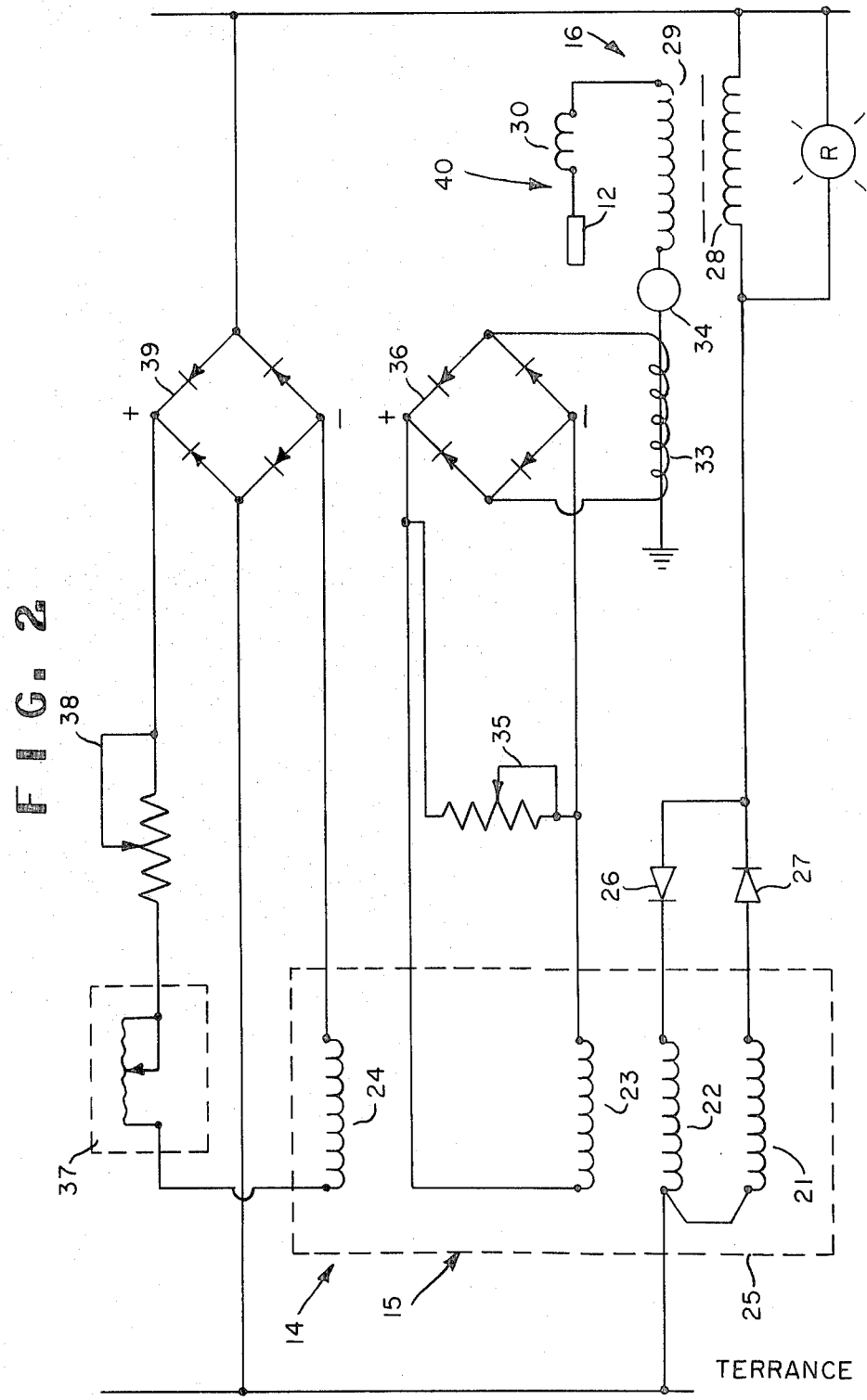

METHOD OF TREATING MATERIAL BY ELECTRICAL DISCHARGE

This is a continuation, of application Ser. No. 879,419, filed Nov. 24, 1969, now abandoned.

BACKGROUND OF THE INVENTION

1. Field of the Invention

This invention is a method of treating material and, more particularly, of treating a moving web of plastic film by electrical discharge.

Such invention includes independently controlling treatment of a plurality of webs at several treating stations all of which are supplied by a common power supply source (e.g., a single motor generator). More specifically, this invention is a method of independently controlling the output current of a plurality of electrical discharge treating stations or means supplied by a common high-frequency power supply source for treating, continuously, webs moving at high speeds.

2. Description of the Prior Art

A major problem encountered in the manufacture of plastic film having improved properties is controlling the treatment of such films by high-frequency electrical discharge as they move at high speeds.

Many different approaches to the solution of this problem are known to the prior art. For example, it is known to control treatment of such films by monitoring power. These various approaches, however, have failed to provide sufficient controls, particularly with webs moving at high speeds, as shown by the considerable variation in effective film treatment as measured, for example, by laboratory inking tests.

U. S. Pat. No. 3,391,314 to Carter is examplary of the prior art. Such patent discloses a process of and apparatus for treating film by electrical discharge to improve its surface characteristics by inserting between a conventional sine-wave generator and the treating electrode an adjustable inductive step-up transformer.

The solving of this problem of controlling film treatment, by controlling the output current within predetermined limits by monitoring the output current at the point of treatment, is the touchstone of this invention.

SUMMARY OF THE INVENTION

The present invention is a method of controlling treatment of plastic film by electrical discharge and, more particularly, is directed to controlling high-frequency electrical treatment of a web of synthetic organic polymeric film moving at high speeds.

Among the most serious problems attaching to the production of plastic material is controlling the electrical discharge applied to the surface of the web.

Attempts have been made to control the level of application of electrical treatment of plastic film during production, such as by use of a wattmeter connected to means for controlling the power source output. Although such attempts have brought about some improvement, they are largely inadequate and fail to provide a completely satisfactory solution to the problem because they cope essentially with only a limited control, removed from the point of treatment application.

The treating method of this invention applies predetermined electrical charges to a high-speed web of plastic film and maintains these charges within set limits by monitoring current output at the point of application. In the present invention, it has been found that by monitoring the electrical charges actually being applied to the web, by measuring the current at the output of the web-treating means, current-controlling means can be set in operation to maintain the proper levels of application.

Accordingly, this invention provides an improved and novel method of treating, by electrical discharge, rapidly moving webs of plastic film or other materials.

Another problem encountered in conventional methods for improving the surface characteristics of a moving plastic web or webs, e.g., of polyethylene, polypropylene, or the like, by means of an electrical discharge, is controlling electrical treatment when more than one treating means is supplied from a single power source. This problem increases as the rate of travel of the film and the frequency of power are increased.

This invention further provides an improved method of controlling the treating of moving dielectric films or webs where more than one electrical discharge means is supplied with power from a single power supply source.

BRIEF DESCRIPTION OF THE DRAWING

FIG. 2 is a circuit diagram of the apparatus of FIG. 1, with parts omitted for clarity, showing, in detail, one of the current-controlling means thereof with its various connections to other parts of the apparatus.

DESCRIPTION OF THE PREFERRED EMBODIMENTS

Figure 1:
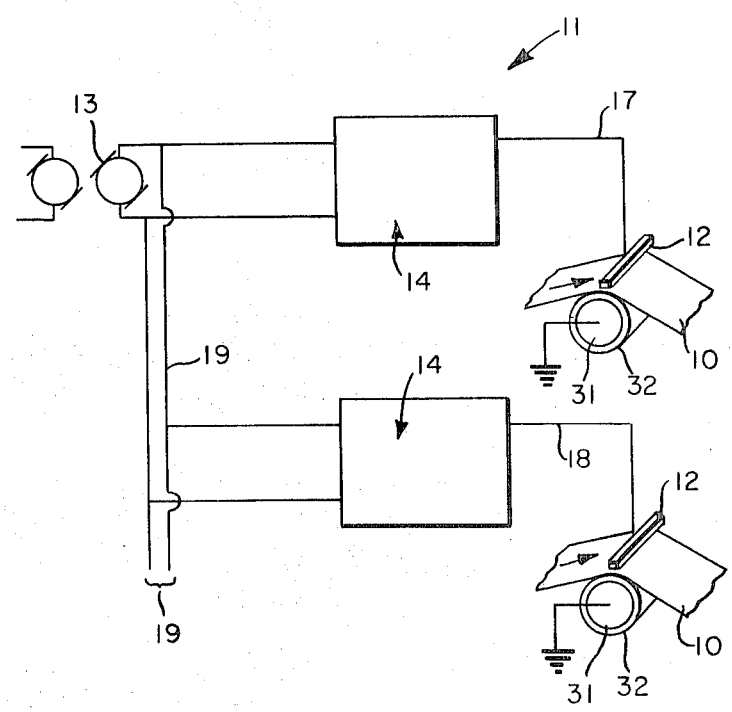
FIG. 1 is a schematic, perspective view, with parts omitted for clarity, of an apparatus for treating web material by the method of the present invention.

The present invention is directed to the discovery that the electrical discharge treatment of high-speed moving webs can be controlled by monitoring the discharge current at the point of treatment.

Referring to the drawing, and FIG. 1 in particular, a web 10 of plastic film to be treated by the method of this invention is supplied from a supply source, not shown, and moved into operative association with a web-treating apparatus 11 which treats the web 10 as it moves therepast, by electrical discharge, thereby to improve certain of its properties or characteristics, such as its printability or its bonding or adhesion characteristics.

The apparatus 11, generally described, includes a web-treating means 12 (or a plurality of web treating means 12, as shown in FIG. 1) connected to a single power supply source 13, preferably in the form of a high-frequency, high voltage power supply. The web 10 preferably is moved past the treating means 12 at relatively high speeds, in a manner known to the art, such as at speeds approaching 1,500 feet per minute.

The preferred web-treating apparatus 11 for accomplishing the method of this invention, as described and claimed in copending patent application Ser. No. 879,576, filed Nov. 24, 1969 and now abandoned, is shown in greater detail in FIG. 2.

As best seen in FIG. 2, the apparatus 11 includes a current-controlling means, generally designated 14, including a magnetic amplifier 15 having an output coupled by leads to a step-up transformer 16.

As shown in FIG. 1, high-voltage leads 17 and 18 respectively connect the transformer 16 to the web-treating means 12.

The current-controlling or current-regulating means 14 also is connected to the power supply source 13 which generates the required high-frequency current (e.g., 10 KHz) and delivers it to a bus 19. A plurality of web-treating means 12 may be supplied from the current-controlling means 14, from the bus 19.

The magnetic amplifier 15 consists of four separate windings 21, 22, 23 and 24 which are contained in a box illustrated as a dotted line 25. If no current is passed through either controlling winding 23 or 24, then current through the controlled windings 21 and 22 would cause the amplifier 15 to saturate very early in each half cycle. When the core material is saturated, the controlled power windings 21 and 22 present almost no impedance to alternating current power; and, therefore, current or power passes through them undiminished. The design of the amplifier 15 requires that only a single polarity pass through each of the two power windings; therefore, a diode 26 allows only positive current to pass through the winding 22, with which it is in series; and a diode 27 allows only negative current through the second power winding 21.

Voltage applied to a primary winding 28 of the step-up transformer 16 is increased in a secondary winding 29. The resulting current passes through a choke coil 30 to an electrode of the web-treating means 12. Voltage on the web-treating means 12 generates a corona in the air gap between the web-treating means or material-treating means 12 and the roll 31 having a dielectric cover 32, as seen in FIG. 1. The web 10 is treated by electrical discharge, by passing it through the corona while substantially in contact with the roll 31, which is appropriately grounded.

It is seen, then, that the primary web treatment circuit portion 40 through which the current is conducted consists of the secondary winding 29 of the step-up transformer 16; the choke 30; the web-treating means 12; the air gap; the web 10 being treated; the dielectric cover 32 on the roll 31; the ground return path; and further includes a current-monitoring means in the form of a current transformer 33 or an ammeter 34, for example.

Treatment current is sensed or monitored by the current-monitoring means. The direct durrent passing through the controlling winding 23 is directly proportional to the treatment current. An increase in that current tends to reduce the voltage applied to the transformer 16 thereby reducing the voltage in the treatment circuit, and its associated treatment current. This negative feedback regulates or controls the treatment current by means of the magnetic amplifier.

Adjustment of a resistor 35 in parallel with the negative feedback winding 23 determines the sensitivity of the control. Increased resistance causes a higher percentage of any current change to be seen by the feedback winding 23, and in this manner increases the sensitivity. A bridge rectifier 36 changes the AC signal to DC to make it applicable to the negative feedback winding 23. The second controlling winding 24 establishes the reference. The magnitude of the treatment current is established by the magnitude of direct current being supplied to the controlling winding 24 through an operators rheostat or pot 37 and a limit resistor 38 which are supplied from a constant 250 volts rectified by a bridge rectifier 39.

It is seen in this apparatus, therefore, that the current-monitoring means 33 acts as a means for sensing current at point of treatment since it is operatively connected to the web 10. Such monitoring means 33 generates a current signal and each such signal is fed through suitable conductors to the current-controlling means 14 which, in turn, provides a controlling means output that is a function of current applied to the web 10. This current-controlling means output is then fed through suitable conductors to the power source 13 which increases or decreases power depending upon the output signal reading.

In this manner, the treatment of the web 10, by electrical discharge through the web-treating means 12, is effectively controlled by looking directly to and at the current output at the point of application as a means for actuating the current-controlling forces or means.

It is to be understood that the method of this invention may be practiced using apparatus for treating materials or webs by electrical discharge other than the preferred web-treating apparatus which has been described in detail. For example, a current-sensing means and current-controlling means such as those described could be incorporated in the web-treating apparatus of U. S. Pat. No. b 3,391,314 to Carter or only a current-sensing means could be used to determine the current at the point of application and, based thereon, manually operable means for regulating or controlling current thereat could be set in motion.

Thus, it is seen that precise control of the electric current supplied to a material- or web-treating means is made possible by the practice of the method of this invention.

I claim:

1. A method of treating a web of polymeric film by alternating current electrical discharge including the steps of:
   moving the web past a web-treating means connected to an alternating current power source;
   treating the web by high-frequency, alternating current electrical discharge by the web-treating means;
   controlling the current being supplied by the web-treating means at the point of treatment by current-controlling means connected to the power source and to the web-treating means;
   the current-controlling means including a magnetic amplifier coupled to a step-up transformer having a primary winding and a secondary winding, the primary winding being connected to the power source and the secondary winding being connected to the web-treating means in a treatment circuit;
   monitoring such current by current-monitoring means connected in series to the current-controlling means; and
   transmitting a current signal which is instantly directly proportional to such current to the current-controlling means whereby the current-controlling means is actuated thereby to maintain such current within the predetermined limits.

2. A method of treating a web of polymeric film by alternating current electrical discharge including the steps of:
   moving the web past a web-treating means;
   treating the web by high-frequency alternating current by the web treating means;
   transmitting a current signal which is instantly directly proportional to such current to current-controlling means;

maintaining such current within predetermined limits based on such signal from said current monitoring means; and wherein the web-treating means, the current-monitoring means, and the current-controlling means are in series.

3. A method of treating a web of a polymeric film by an alternating current electrical discharge including the steps of:

moving the web past a web-treating means;

conducting an alternating current to the web-treating means through an electrical circuit;

inductively sensing at the point of treatment the alternating current to the web-treating means in the electrical circuit at the point of treatment to provide an alternating current signal proportional to the current at the web-treating means;

utilizing the alternating current signal to maintain the current to the web-treating means within predetermined limits.

4. A method of treating a web of a polymeric film by an alternating current electrical discharge including the steps of:

moving the web past a web-treating means;

conducting an alternating current to the web-treating means through an electrical circuit;

inductively sensing at the point of treatment the alternating current to the web-treating means in the electrical circuit at the point of treatment to provide an alternating current signal which is proportional to the current at the web-treating means;

feeding back the alternating current signal through a rectifier to change the alternating current signal to a direct current signal;

passing the direct current signal through a control winding of a magnetic amplifier through an adjustable resistor;

adjusting the restistor to determine the sensitivity of the control in which increases and decreases in the sensed alternating current signal maintain the treatment current within preselected limits.

5. The method of claim 4 wherein the treating is conducted in parallel with at least one other treating station coupled to the same source of power.

* * * * *